United States Patent
Zhu et al.

(10) Patent No.: US 7,309,388 B2
(45) Date of Patent: Dec. 18, 2007

(54) JET INK COMPOSITION FOR LOW SURFACE ENERGY SUBSTRATES

(75) Inventors: Linfang Zhu, Naperville, IL (US); Godwin Deng, Schaumburg, IL (US); Arsenia C. Morelos, Glendale Heights, IL (US)

(73) Assignee: Videojet Technologies Inc., Wood Dale, IL (US)

( * ) Notice: Subject to any disclaimer, the term of this patent is extended or adjusted under 35 U.S.C. 154(b) by 0 days.

(21) Appl. No.: 10/775,979

(22) Filed: Feb. 10, 2004

(65) Prior Publication Data

US 2004/0154495 A1  Aug. 12, 2004

Related U.S. Application Data

(60) Provisional application No. 60/446,543, filed on Feb. 12, 2003.

(51) Int. Cl.
*C09D 11/02* (2006.01)

(52) U.S. Cl. ............. 106/31.4; 106/31.75; 106/31.72

(58) Field of Classification Search ........... 106/31.4, 106/31.75, 31.72
See application file for complete search history.

(56) References Cited

U.S. PATENT DOCUMENTS

| | | | |
|---|---|---|---|
| 3,060,429 A | | 10/1962 | Winston |
| 3,298,030 A | | 1/1967 | Lewis et al. |
| 3,373,437 A | | 3/1968 | Sweet et al. |
| 3,416,153 A | | 12/1968 | Hertz et al. |
| 3,673,601 A | | 6/1972 | Hertz |
| 4,567,213 A | * | 1/1986 | Bhatia et al. ............. 523/160 |
| 4,680,058 A | | 7/1987 | Shimizu et al. |
| 5,254,158 A | | 10/1993 | Breton et al. |
| 5,407,474 A | * | 4/1995 | Airey et al. ............ 106/31.05 |
| 5,430,093 A | | 7/1995 | Miyamoto et al. |
| 5,443,628 A | * | 8/1995 | Loria et al. ............ 106/31.65 |
| 5,500,251 A | | 3/1996 | Burgoyne, Jr. et al. |
| 5,594,044 A | | 1/1997 | Yang |
| 5,889,083 A | * | 3/1999 | Zhu ........................ 523/161 |
| 6,010,564 A | * | 1/2000 | Zhu et al. ............... 106/31.37 |
| 6,221,933 B1 | | 4/2001 | Zhu et al. |
| 6,251,175 B1 | | 6/2001 | Zhu et al. |
| 6,444,019 B1 | | 9/2002 | Zou et al. |
| 6,726,756 B1 | * | 4/2004 | Zou et al. ............... 106/31.57 |
| 2003/0124471 A1 | * | 7/2003 | Ishii et al. ............... 430/496 |
| 2004/0110868 A1 | * | 6/2004 | Zhu et al. ................ 523/160 |

FOREIGN PATENT DOCUMENTS

| | | | |
|---|---|---|---|
| GB | 2105735 A | | 3/1983 |
| JP | 60092370 A | | 5/1985 |
| JP | 05098203 A | * | 4/1993 |
| WO | WO9623844 | * | 8/1996 |
| WO | WO97/35933 A1 | | 10/1997 |
| WO | WO 01/90262 A2 | | 11/2001 |
| WO | WO 01/090262 A2 | * | 11/2001 |

OTHER PUBLICATIONS

English Machine translation of JP 05-098203.*
Keeling, Phys. Technol., 12(5), 195-303 (1981), no month available.
Kuhn et al., Scientific American, Apr. 1979, 162-178.

* cited by examiner

*Primary Examiner*—C. Melissa Koslow
*Assistant Examiner*—Veronica Faison-Gee
(74) *Attorney, Agent, or Firm*—Leydig, Voit & Mayer, Ltd

(57) ABSTRACT

Disclosed are jet ink compositions suitable for printing on substrates such as plastics and oil contaminated metals messages having excellent adhesion, for example, scratch resistance. The jet ink composition comprises one or more organic solvents, a rosin resin, and a colorant, and optionally a co-binder resin, e.g., a vinyl resin. Preferably, the jet ink composition is free or substantially free of a cellulose nitrate resin and/or a slow evaporating solvent. The present invention further provides a method for printing scratch resistant messages on a low surface energy substrate comprising projecting a stream of droplets of the jet ink composition to the substrate, controlling the direction of the stream so that the droplets are caused to form the desired printed messages, and allowing the messages to dry.

22 Claims, No Drawings

JET INK COMPOSITION FOR LOW SURFACE ENERGY SUBSTRATES

CROSS-REFERENCE TO RELATED APPLICATION

This application claims the benefit of U.S. provisional patent application No. 60/446,543, filed Feb. 12, 2003, the disclosure of which is incorporated by reference.

FIELD OF THE INVENTION

This invention pertains to ink jet ink compositions suitable for printing messages having improved adhesion and scratch resistance. The invention is especially advantageous for printing messages on low surface energy substrates in general, and in particular, low surface energy plastic substrates and oil-contaminated metal substrates. The invention also pertains to a method for printing such messages with improved adhesion and scratch resistance.

BACKGROUND OF THE INVENTION

Ink jet printing is a well-known technique by which printing is accomplished without contact between the printing device and the substrate on which the printed characters are deposited. Briefly described, ink jet printing involves the technique of projecting a stream of ink droplets to a surface and controlling the direction of the stream so that the droplets are caused to form the desired printed image on that surface. This technique of noncontact printing is particularly well suited for application of characters onto substrates such as glass, metal, or plastic containers and packages.

Reviews of various aspects of ink jet printing can be found in these publications: Kuhn et al., Scientific American, April, 1979, 162-178; and Keeling, Phys. Technol., 12(5), 196-303 (1981). Various ink jet apparatuses are described in the following U.S. Pat. Nos. 3,060,429, 3,298,030, 3,373,437, 3,416,153, and 3,673,601.

In general, an ink jet ink composition must meet certain requirements to be useful in ink jet printing operations. These requirements relate to viscosity, resistivity, solubility, compatibility of components and wettability of the substrate. Further, the ink must be quick-drying and smear resistant, resist abrasion, and be capable of passing through the ink jet nozzle without clogging, and permit rapid cleanup of the machine components with minimum effort. In addition, the printed messages must have sufficient adhesion to the substrates.

Plastic substrates, particularly polyolefins, are often used in packaging. For example, oriented polypropylene (OPP) films are widely used as packaging materials such as the over-wraps for cigarette packages and cartons because of their ability to heat seal and provide good barrier properties in maintaining freshness and moisture content of the packaged goods. These and other low surface energy substrates present certain problems with respect to the quality and robustness of the printed message. The messages are sometimes rubbed off or scratched off during normal handling even with relatively moderate force if the adhesion of the message to the substrate is poor. In order to alleviate this problem, the plastic substrates are sometimes provided with a surface pretreatment such as oxidation, carona treatment or plasma treatment, or a coating of a primer. However, such pretreatments undesirably add to the cost of the package manufacturing process.

Further, OPP films often contain slip additives to provide adequate seal release or coefficient of friction. These additives are predominantly migratory fatty acid amides, which bloom to the film surface and provide the slip property. These additives are believed to be contributing factors in the degradation of ink adhesion over time as well as adhesion variation due to the age difference of the films. The presence of such additives makes the ink adhesion on low surface energy films even more challenging.

Some attempts have been made to provide ink compositions for improving the adhesion of the printed message to low surface energy plastic substrates, for example, by the use of certain acrylamides or chlorinated polypropylene resin; see, for example, U.S. Pat. Nos. 5,430,093 and 5,500,251. However, other approaches are desirable.

The foregoing indicates that there is a need for a jet ink composition that is suitable for printing on plastic surfaces, particularly low energy surfaces such as polyolefin surfaces, messages that have abrasion or scratch resistance in general, and in particular, messages that have fingernail scratch or finger rub resistance.

The invention provides such a composition. The advantages of the invention, as well as additional inventive features, will be apparent from the description of the invention provided herein.

BRIEF SUMMARY OF THE INVENTION

The foregoing needs have been fulfilled to a great extent by the present invention which provides a jet ink composition suitable for printing messages on substrates, such as plastics, that have abrasion resistance and scratch resistance. The jet ink composition comprises one or more organic solvents, a rosin resin, and a colorant, and optionally a co-binder resin, e.g., a vinyl resin. Preferably, the jet ink composition is free or substantially free of a cellulose nitrate resin and/or a slow evaporating solvent.

The present invention further provides a method for printing abrasion or scratch resistant messages on a substrate comprising projecting a stream of droplets of the jet ink composition to the substrate, controlling the direction of the stream so that the droplets are caused to form the desired printed messages, and allowing the messages to dry.

The foregoing advantages of the present invention, as well as additional inventive features, will be apparent from the description of the embodiments of the invention provided herein.

DETAILED DESCRIPTION OF THE INVENTION

The present invention provides a jet ink composition suitable for printing on substrates, such as low surface energy plastics messages, having abrasion or scratch resistance, the composition comprising one or more organic solvents, a colorant, and a rosin resin. The ink composition may further include one or more ingredients such as co-binder resins, plasticizers, wetting agents, defoamers, and conductivity agents.

The present invention is predicated on the discovery that jet ink compositions containing a rosin resin have unique and unexpected properties. The messages printed on substrates, particularly low energy substrates such as polyolefins, have excellent adhesion to the substrates. The messages show improved scratch resistance. A further advantage of the ink composition of the present invention is that abrasion resistant messages can be printed on low energy surfaces even without the use of an adhesion promoter or a surface treatment. Although not required, it is contemplated that a surface treatment, or an adhesion promoter, might improve adhesion even more.

In an embodiment, the present invention provides a jet ink composition comprising one or more organic solvents, a rosin resin, a co-binder resin, and a colorant, wherein the jet ink composition is free or substantially free of a cellulose nitrate resin. In another embodiment, the present invention provides a jet ink composition comprising one or more organic solvents, a rosin resin, a vinyl resin, and a colorant. In a further embodiment, the present invention provides a jet ink composition comprising one or more organic solvents, a rosin resin, and a colorant, wherein the jet ink composition is free or substantially free of a cellulose nitrate resin and slow evaporating solvents.

The jet ink compositions of the present invention can be used in continuous or drop on demand printers. When used in continuous ink jet printing, they have (1) a viscosity from about 1.6 to about 10.0 centipoises at 25° C.; (2) an electrical resistivity from about 50 to about 2000 ohm-cm; and (3) a sonic velocity from about 1100 to about 1700 meters/second.

The jet ink compositions of the present invention includes at least one organic solvent. A mixture of 2, 3, 4, or more organic solvents can be used. Any suitable solvent can be used, and in a preferred embodiment, the solvent has sufficient solubility for the rosin resin and/or the co-binder resin (if a co-binder resin is used), and in a more preferred embodiment, the solvent has sufficient solubility for the rosin resin as well as the co-binder resin. The organic solvent also preferably has sufficient volatility, or evaporation rate, to provide suitable, e.g., short, dry times of the printed messages. Examples of organic solvents include alcohols, ketones, esters, ethers, amides, and combinations thereof, and preferably ketones, more preferably lower ketones. A particular example of an organic solvent is methyl ethyl ketone. If water is present, it is preferable to keep the water content low, for example, below 5%, more preferably below 2%, and more preferably below 1%, by weight of the solvent mixture.

The organic solvent, or a mixture of solvents, can be present in any suitable amount, for example, in an amount of up to about 90% by weight of the jet ink composition. In an embodiment, the organic solvent, or a mixture of solvents, can be present in an amount of from about 30% by weight to about 90% by weight, preferably in an amount of from about 50% to about 80% by weight, of the jet ink composition. In another embodiment, the organic solvent, or a mixture of solvents, can be present in an amount of from about 70% to about 90% by weight, and preferably in an amount of about 75% to 85% by weight, of the jet ink composition.

The jet ink composition, according to certain embodiments of the invention, are free or substantially free of slow evaporating solvents, for example, solvents having an evaporation rate of about 0.5 or less, preferably about 0.3 or less, and more preferably about 0.2 or less, relative to n-butyl acetate which has an evaporation rate of 1.0. See, for example, U.S. Pat. No. 6,444,019, column 5, lines 2-26. If a slow evaporating solvent is present, it is preferably present in a small quantity, for example, about 5% by weight or less, more preferably about 3% by weight or less, and even more preferably about 1% by weight or less, of the jet ink composition.

The jet ink composition of the present invention comprises a rosin resin. Any suitable rosin resin can be used. The rosin resin can be a natural resin or a modified resin. Modified rosin resins include, for example, stabilized rosin resins, polymerized rosin resins, and esterified rosin resins. Esterification can be carried out using monovalent alcohols such as alcohols such as methanol, ethanol, propanol and the like, and polyvalent alcohols such as ethylene glycol, propylene glycol, glycerol, pentaerythritol, and the like. The rosin resin can also be modified by addition reactions such as by addition of a maleic anhydride or by hydrogenation or dehydrogenation to render the rosin resin more stable, e.g., to oxidation. In a preferred embodiment, the rosin resin is a glycerol modified hydrogenated rosin ester. In an embodiment, the rosin resin has a low acid number, for example about 20 or less, e.g., about 10 or less, preferably about 8 or less. An example of a glycerol modified hydrogenated rosin ester is STAYBELITE® Ester 10, available from Hercules Inc., which has an acid number of 8.

The rosin resin can be present in any suitable amount, for example, in certain embodiments, in an amount of from about 20% by weight to about 40% by weight, and preferably about 25% by weight to about 35% by weight, of the jet ink composition, and in certain other embodiments, in an amount of from about 5% by weight to about 20% by weight, and preferably from about 7% by weight to about 15% by weight, of the jet ink composition. The amount of rosin resin can also range from about 1 to about 5% in some embodiments, e.g., where a pigment is present.

Without wishing to be bound by any theory or mechanism, it is believed that the rosin resin, when present in the printed message, acts as a solid solvent for the slip additive that blooms to the surface of the substrate. As the slip additive is soaked up (or dissolved) by the rosin resin in the printed image, the additive does not reside at the interface between the substrate and the printed message. This soaking up or dissolution of the additive prevents the deterioration of the adhesion between the printed message and the substrate. It is believed that this phenomenon may be responsible for the improved adhesion. The ink jet ink composition also is able to penetrate certain contaminants found on substrates, such as oily contaminants found on parts of metal cans, e.g., lids, to provide good adhesion to the substrates.

The jet ink composition of the present invention, in embodiments, may include one or more co-binder resins. Any suitable co-binder resin can be used. Examples of co-binder resins include vinyl resins, acrylic resins, styrene-acrylic resins, silicone resins, polyesters, polyamides, polyvinylpyrrolidone, polyurethane resins, epoxy resins, alkyd resins, hydrocarbon resins, nitrocellulose (or cellulose nitrate), cellulosic resins, cellulose acetate, ketone resins, and aldehyde resins. In certain embodiments, high molecular weight co-binder resins are preferred, for example, co-binder resins having a molecular weight of about 10,000 or more. A particular example of a co-binder resin is BAKELITE™ VMCH resin (Union Carbide), which is a 86:13:1 terpolymer of vinyl chloride, vinyl acetate, and maleic acid having a number average molecular weight of about 21,000.

The co-binder resin can be present in any suitable amount, preferably in an amount less than the rosin resin. For example, the co-binder resin can be present in an amount of from about 1% by weight to about 20% by weight, preferably from about 2% by weight to about 10% by weight, and more preferably from about 3% by weight to about 5% by weight, of the jet ink composition.

Jet ink compositions, in accordance with some embodiments of the invention, are free or substantially free of a nitrocellulose resin. If present, the nitrocellulose resin is present in a small quantity, for example, in an amount of about 5% by weight or less, more preferably about 3% by weight or less, and even more preferably about 1% by weight or less.

The jet ink composition of the present invention includes a colorant, which can be a dye, pigment, or lake, a combination thereof. Preferably, the colorant is a dye. Any dye that may be dissolved in the ink composition may be used in the instant invention. Examples of dyes suitable for use in the ink composition of the present invention include, but are not limited to, the yellow dyes such as C.I. Solvent Yellow 19 (C.I. 13900A), C.I. Solvent Yellow 21 (C.I. 18690), C.I. Solvent Yellow 61, C.I. Solvent Yellow 80, and the like, the orange dyes such as C.I. Solvent Orange 1 (C.I. 11920), C.I. Orange 37, C.I. Orange 40, and the like, red dyes such as C.I. Solvent Red 8, C.I. Solvent Red 81, C.I. Solvent Red 82, C.I. Solvent Red 84, C.I. Solvent Red 100, and the like, violet dyes such as C.I. Solvent Violet 8, C.I. Solvent Violet 21, and the like, blue dyes such as C.I. Solvent Blue 2, C.I. Solvent Blue 11, C.I. Solvent Blue 25, C.I. Solvent Blue 36, C.I. Solvent Blue 55, and the like, green dyes such as C.I. Solvent Green 3 and the like, brown dyes such as C.I. Solvent Brown, and the like, black dyes such as C.I. Solvent Black 3, C.I. Solvent Black 5, C.I. Solvent Black 7, C.I. Solvent Black 22, C.I. Solvent Black 27, C.I. Solvent Black 29, and the like. A particular example of a dye is C.I. Solvent Black 29, which is commercially available as Valifast Black 3810 (Orient Chemical) or Orasol Black RLI (Ciba).

In certain embodiments of this invention, a pigment may be preferred; for example, if the intended substrates are dark colored, an opaque pigment will provide better contrast. Both organic and inorganic pigments are suitable. Examples of suitable opaque inorganic pigments include titanium dioxide-anatase and rutile, Bismuth Vanadate, zinc oxide, zinc sulfide, and lithopone. Examples of suitable opaque organic pigments include Pigment Yellow 139, Pigment Orange 16, Pigment Orange 34, Pigment Orange 61, Pigment Orange 62, Pigment Orange 64, Pigment Red 254, Pigment Red 255, Pigment Brown 5, and the like. Another example of organic pigments is carbon black. Carbon black includes channel black, furnace black, and lamp black. Examples of other suitable organic and inorganic pigments include Metallized Azo Reds such as Red 49:1 (Barium salt), Red 49:2 (Calcium salt), Red 63:1 (Calcium salt), Toluidine Reds, Naphthol Reds, Pyrazalones, Rhodamines, Quinacridones such as Red B, Red Y, Magenta B, Magenta and Violet, Phthalocyanine Blues, Phthalocyanine Greens, Carbazole Yellow, Monoarylide Yellow, Diarylide Yellow, Chrome Yellow, Red Lake C, Lithol Reds such as calcium and barium salts, Lithol Rubine, Bon Maroon, Perylene pigments, Red 2B pigments including the calcium, barium and magnesium salts, Chrome yellow, Chrome Orange, Molybdate Orange, Lead Chromes, Lead Silicochromates, Zinc Chromes, barium chromate, strontium chromate, titanium nickel yellow, Liminites, Haematite, Magnetite, Micaceous Oxides of Iron, Siderite, Iron Pyrites, Ferrite Yellow, Red Oxide, Prussian Blue, Orange 36, Diarylide Orange, Dianisidine Orange, Tolyl Orange, and Dinitraniline Orange. Other suitable examples of pigments include lakes, for instance, lakes formed from acid dyes and alkali or alkaline earth metals.

The colorant can be present in the ink composition in any amount required to produce the desired contrast and readability. The colorant is preferably present in an amount of from about 1% to about 18% by weight of the jet ink composition and more preferably in the range of about 2% to about 15% by weight of the jet ink composition.

The jet ink composition in accordance with embodiments of the invention may also include a plasticizer. It is believed that the plasticizer improves the flexibility of the film that forms when the ink dries on the substrate. The improved flexibility may contribute to a certain extent to an improvement in abrasion resistance. Any suitable plasticizer known in the industry can be used. See, e.g., U.S. Pat. No. 5,594,044 which discloses at column 6, line 36, to column 7, line 6, plasticizers suitable for use in ink jet compositions, the disclosure of which is incorporated herein by reference. A preferred plasticizer for use in the ink composition of the present invention is SANTICIZER™ 160 which is butyl benzyl o-phthalate and available from Monsanto Co.

The plasticizer can be present in any suitable amount. For example, the plasticizer can be present in the jet ink composition in an amount of up to about 5% by weight of the ink composition, preferably in an amount of from about 0.5% by weight to about 3% by weight, and more preferably in an amount of from about 0.5% to about 2% by weight of the ink composition.

The jet ink composition in accordance with some embodiments of the invention may further include a wetting agent, for example, to control the droplet size of the ink. Any suitable wetting agent may be used. An example of a wetting agent is a surfactant. The surfactant may be anionic, cationic, nonionic, or amphoteric. SILWET™ L-7622, available from Witco Corp., OSI Specialties Group, Tarrytown, N.Y., is a silicone based wetting agent and is an example of a preferred wetting agent. For additional wetting agents, see, e.g., U.S. Pat. No. 5,594,044, column 5, lines 43-64, the disclosure of which is incorporated herein by reference.

The wetting agent may be present in the jet ink composition in an amount of up to about 1% by weight, preferably in an amount of about 0.1% to about 1% by weight of the jet ink composition.

The jet ink composition in accordance with some embodiments of the invention may include a defoamer. The defoamer reduces the foaming tendency of the jet ink composition. An example of a suitable defoamer is BYK™ 065 from BYK-Chemie USA. The defoamer can be present in any suitable amount of, e.g., up to about 1% by weight of the jet ink composition.

The jet ink composition may also contain other additives generally known in the ink jet ink printing art, e.g., for adjusting the viscosity, electrical resistivity, and the speed of evaporation. One or more humectants can be present.

The jet ink compositions may also contain one or more conductivity agents. If present, they would typically be present in an amount of up to about 2.0% by weight of the ink composition. Examples of suitable conductivity agents include lithium trifluoromethanesulfonate, tetraethylammonium p-toluenesulfonate, tetrabutylphosphonium bromide, tetrapropylammonium bromide, tetrabutylammonium chloride, tetrabutylammonium nitrate, tetrabutylammonium hexafluorophosphate. Sufficient conductivity may be offered by some of the dyes (e.g., soluble dyes) in the presence of the solvent used in the ink and a conductivity agent may not be necessary. If a pigment is used, then a conductivity agent may be needed.

The present invention provides embodiments of the jet ink composition wherein the one or more organic solvents are present in an amount of from about 50% to about 80% by weight of the composition, the rosin resin is present in an amount of from about 20% to about 40% by weight of the composition, and the colorant is present in an amount of from about 5% to about 10% by weight of the composition.

The jet ink composition may further comprise a wetting agent in an amount of from about 0.1% to about 1% by weight of the composition.

The present invention also provides embodiments wherein the one or more organic solvents are present in an amount of from about 70% to about 90% by weight of the composition, the rosin resin is present in an amount of from about 1% to about 20% by weight of the composition, the co-binder resin is present in an amount of from about 2% to about 10% by weight, preferably from about 2% to about 6% by weight of the composition, and the colorant is present in an amount of from about 2% to about 15% by weight of the composition. The jet ink composition may further comprise a wetting agent in an amount of from about 0.1% to about 1% by weight of the composition, a plasticizer in an amount of from about 0.1% to 2% by weight of the composition, and/or a defoamer in an amount of from 0.5% to about 1.5% by weight of the composition.

The present invention further provides a method for printing messages having adhesion on a low surface energy substrate comprising projecting a stream of droplets of any of the jet ink composition described above to the substrate, controlling the direction of the stream so that the droplets are caused to form the desired printed messages, and allowing the messages to dry. In accordance with the present invention, any suitable substrate having low surface energy can be printed on. An advantage of the ink composition of the present invention is that substrates that include a blooming additive such as a fatty amide can be printed with messages that have improved scratch and adhesion resistance.

Examples of suitable substrates include plastics and oil or lubricant coated or contaminated metals. Examples of plastics include polyolefins such as polyethylene and polypropylene, preferably polypropylene; and halogenated polyolefins, e.g., polyvinyl chloride (PVC). The plastics can be oriented or non-oriented. If oriented, they can be monoaxially oriented, biaxially oriented, or a combination thereof, preferably biaxially oriented. A particular example of a suitable substrate is biaxially oriented polypropylene (BOPP) such as the over-wrap films used on most cigarette packages and cartons. It is contemplated that substrates such as homopolymers and copolymers of haloolefins and olefins, e.g., polyvinylidene fluoride, PTFE, polychlorotrifluoroethylene, copolymers of vinyl chloride and vinylidene chloride, may also be suitable for printing with the jet ink composition of the present invention. In embodiments, the substrates have a surface energy of about 40 dynes/cm or less.

The following examples further illustrate the invention but, of course, should not be construed as in any way limiting its scope.

EXAMPLES

These Examples illustrate jet ink compositions prepared in accordance with certain embodiments of the present invention (Table 1). These Examples also illustrate some of the properties of the jet ink composition of the present invention (Tables 2-5). The jet ink compositions of Examples 1-4 are printed on samples of BOPP films and the finger nail scratch resistance of the printed codes are determined as a function of time after printing, by scratching 10 times with light pressure, and the degree of code removal is recorded. Comparative Examples 1-4 are commercial jet ink compositions. The results from finger nail scratch resistance tests are set forth in Tables 2-4. The BOPP samples may have aged differently as the time of arrival in applicants' laboratory differed. Thus, sample No. 1 arrived the earliest, sample Nos. 2 and 4 arrived later, and sample Nos. 3, 5, and 6 arrived subsequently. Scratch resistance rating: 1—no change; 2—slight removal; 3—partial removal; 4—mostly removed; and 5—complete removal.

Finger rub resistance of a code on a difficult to print can lid is tested and the number of hard finger rubs to remove the codes is set forth in Table 5.

TABLE 1

Examples of Jet Ink Compositions

| COMPONENTS | EXAMPLE 1 | EXAMPLE 2 | EXAMPLE 3 | EXAMPLE 4 |
|---|---|---|---|---|
| Methyl ethyl ketone (solvent) | 83.2 | 80.7 | 76.6 | 61.5 |
| STAYBELITE Ester 10 (rosin ester) | 8.0 | 10.0 | 12.0 | 30.0 |
| BAKELITE VMCH (vinyl resin) | 3.3 | 3.3 | 5.0 | |
| SANTICIZER 160 (plasticizer) | 1.0 | 1.0 | | |
| ORASOL BLACK RLI (dye) | 4.0 | 4.5 | 5.0 | 8.0 |
| SIL WET L-7622 (wetting agent) | 0.5 | 0.5 | 0.5 | 0.5 |
| BYK 065 (defoamer) | | | 0.9 | |
| Total | 100% | 100% | 100% | 100% |

TABLE 2

Finger nail scratch resistance 72 hrs after printing

| Sample Nos. | Ex. 1 | Ex. 2 | Ex. 3 | Ex. 4 | Comp. Ex. 1 | Comp. Ex. 2 | Comp. Ex. 3 | Comp. Ex. 4 |
|---|---|---|---|---|---|---|---|---|
| 1 | 2 | 1 | 1 | 2 | 4 | 5 | 5 | 5 |
| 2 | 1 | 1 | 1 | 1 | 4 | 5 | 5 | 5 |
| 3 | 2 | 2 | 1 | 2 | 3 | 4 | 5 | 4 |
| 4 | 1 | 1 | 1 | 2 | 4 | 4 | 5 | 4 |
| 5 | 1 | 1 | 1 | 1 | 4 | 4 | 5 | 5 |
| 6 | 1 | 1 | 1 | 1 | 3 | 4 | 5 | 5 |

TABLE 3

Finger nail scratch resistance 24 hrs after printing

| Sample Nos. | Ex. 1 | Ex. 2 | Ex. 3 | Ex. 4 | Comp. Ex. 1 | Comp. Ex. 2 | Comp. Ex. 3 | Comp. Ex. 4 |
|---|---|---|---|---|---|---|---|---|
| 1 | 2 | 1 | 1 | 2 | 3 | 4 | 5 | 4 |
| 2 | 1 | 1 | 1 | 1 | 3 | 4 | 4 | 3 |
| 3 | 1 | 1 | 1 | 2 | 3 | 3 | 5 | 3 |
| 4 | 1 | 1 | 1 | 2 | 3 | 4 | 5 | 4 |
| 5 | 1 | 1 | 1 | 2 | 3 | 3 | 5 | 4 |
| 6 | 1 | 1 | 1 | 1 | 3 | 3 | 5 | 4 |

TABLE 4

Finger nail scratch resistance 1 hr after printing

| Sample Nos. | Ex. 1 | Ex. 2 | Ex. 3 | Ex. 4 | Comp. Ex. 1 | Comp. Ex. 2 | Comp. Ex. 3 | Comp. Ex. 4 |
|---|---|---|---|---|---|---|---|---|
| 1 | 2 | 2 | 1 | 1 | 3 | 3 | 5 | 4 |
| 2 | 1 | 1 | 1 | 1 | 3 | 2 | 4 | 3 |
| 3 | 2 | 1 | 1 | 2 | 2 | 2 | 4 | 3 |
| 4 | 1 | 1 | 1 | 2 | 3 | 2 | 5 | 3 |
| 5 | 1 | 1 | 1 | 2 | 2 | 3 | 5 | 3 |
| 6 | 1 | 1 | 1 | 1 | 3 | 2 | 5 | 3 |

TABLE 5

Finger rub resistance of code on can lid

| 1 hr after printing | Example 1 | Com. Ex. 1 | Com. Ex. 2 | Com. Ex. 4 |
|---|---|---|---|---|
| Can lid | 10+ | 2-3 | 3-4 | 4-5 |

The foregoing shows that the jet ink compositions of the present invention have excellent adhesion (finger nail scratch resistance and finger rub resistance) to low surface energy substrates. While the jet ink compositions of the present invention are especially advantageous for use with low surface energy substrates, the inventive jet ink compositions would also provide improved adhesion and scratch resistance on high surface energy substrates.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A jet ink composition comprising methyl ethyl ketone and/or acetone as solvent, a rosin ester resin, a vinyl resin, and a colorant, wherein said jet ink composition has (1) a viscosity from about 1.6 to about 10.0 centipoises at 25° C.; (2) an electrical resistivity from about 50 to about 2000 ohm-cm; and (3) a sonic velocity from about 1100 to about 1700 meters/second.

2. A jet ink composition comprising methyl ethyl ketone and/or acetone as solvent, a rosin ester resin, a vinyl resin, and a colorant, wherein the jet ink composition is free or substantially free of a cellulose nitrate resin and slow evaporating solvents wherein the slow evaporating solvents have an evaporation rate of less than about 0.5 where n-butyl acetate has an evaporation rate of 1.0, wherein said jet ink composition has (1) a viscosity from about 1.6 to about 10.0 centipoises at 25° C.; (2) an electrical resistivity from about 50 to about 2000 ohm-cm; and (3) a sonic velocity from about 1100 to about 1700 meters/second.

3. The jet ink composition of claim 1, wherein the rosin ester resin is a hydrogenated rosin ester resin.

4. The jet ink composition of claim 3, wherein tile hydrogenated rosin ester rosin is a glycerol modified hydrogenated rosin ester resin.

5. The jet ink composition of claim 1, wherein the colorant is a dye, pigment, lake, or a combination thereof.

6. The jet ink composition of claim 5, wherein the colorant is a dye.

7. The jet ink composition of claim 1, further comprising a plasticizer.

8. The jet ink composition of claim 1, further comprising a wetting agent.

9. The jet ink composition of claim 1, further comprising a defoamer.

10. The jet ink composition of claim 1, wherein the solvent is present in an amount of from about 70% to about 90% by weight of the composition, the rosin eater resin is present in an amount of from about 1% to about 20% by weight of the composition, the vinyl rosin is present in an amount of from about 2% to about 10% by weight of the composition, and the colorant is present in an amount of from about 2% to about 15% by weight of the composition.

11. The jet ink composition of claim 10, further comprising a wetting agent in an amount of from about 0.1% to about 1% by weight at the composition.

12. The jet ink composition of claim 10, further comprising a plasticizer in an amount of from about 0.1% to 2% by weight of the composition.

13. The jet ink composition of claim 10, further comprising a detained in an amount of from 0.5% to about 1.5% by weight of the composition.

14. A method for printing messages having adhesion on a low surface energy substrate comprising projecting a stream of droplets of the jet ink composition of claim 1, to the substrate, controlling the direction of the stream so that the droplets are caused to form the desired printed messages, and allowing the messages to dry.

15. The method of claim 14, wherein the low surface energy substrate is a plastic.

16. The method of claim 15, wherein the plastic is a polyolefin or a halogenated polyolefin.

17. The method of claim 16, wherein the polyolefin is polypropylene.

18. The method of claim 17, wherein the polypropylene is mono- or bi-axially oriented polypropylene.

19. The method of claim 14, wherein the low surface energy substrate is an oil-contaminated metal.

20. A jet ink composition comprising methyl ethyl ketone and/or acetone as solvent, a rosin ester resin, a vinyl resin, a cellulosic resin, and a colorant.

21. The jet ink composition of claim 20, which is also free of cellulose nitrate and free or substantially free of slow evaporating solvents, wherein the stow evaporating solvents have an evaporation rate of less than about 0.5 where n-butyl acetate has an evaporation rate of 1.0.

22. A method for printing messages having adhesion on a low surface energy substrate comprising projecting a steam of droplets of the jet ink composition of claim 20, to the substrate, controlling the direction of the stream so that the droplets are caused to form the desired printed messages, and allowing the messages to dry.

* * * * *

UNITED STATES PATENT AND TRADEMARK OFFICE
CERTIFICATE OF CORRECTION

| | | |
|---|---|---|
| PATENT NO. | : 7,309,388 B2 | Page 1 of 1 |
| APPLICATION NO. | : 10/775979 | |
| DATED | : December 18, 2007 | |
| INVENTOR(S) | : Zhu et al. | |

It is certified that error appears in the above-identified patent and that said Letters Patent is hereby corrected as shown below:

Claim 4, Column 10, Line 14: "tile" should read --the--.

Claim 11, Column 10, Line 37: "at" should read --of--.

Claim 13, Column 10, Line 42: "detained" should read --defoamer--.

Signed and Sealed this

Twenty-seventh Day of May, 2008

JON W. DUDAS
*Director of the United States Patent and Trademark Office*